United States Patent
Lin

[11] Patent Number: 5,970,178
[45] Date of Patent: Oct. 19, 1999

[54] ADAPTIVE HALFTONING BASED ON IMAGE CONTENT

[75] Inventor: Qian Lin, Santa Clara, Calif.

[73] Assignee: Hewlett-Packard Company, Palo Alto, Calif.

[21] Appl. No.: 08/884,750

[22] Filed: Jun. 30, 1997

[51] Int. Cl.$^6$ .................................................. H04N 1/405
[52] U.S. Cl. .............................................................. 382/251
[58] Field of Search .................................. 382/251–253; 358/534–536, 429–430, 456–460, 298

[56] References Cited

U.S. PATENT DOCUMENTS

| | | | |
|---|---|---|---|
| 4,974,097 | 11/1990 | Kaneko et al. | 358/400 |
| 5,701,366 | 12/1997 | Ostromoukhov et al. | 382/237 |

Primary Examiner—Thomas D. Lee
Assistant Examiner—Stephen Brinich

[57] ABSTRACT

A process and apparatus is described to improve halftone image quality by integrating different halftoning algorithms and managing their transitions based on image content. The method works by applying different halftoning methods to different regions of a continuous-tone image. Regions of the continuous-tone image are evaluated to determine suitability for halftoning by at least two different halftoning methods. The most suitable halftoning method is then used to halftone a particular region. An activity index is used to evaluate each region. A halftoning method such as error diffusion is deemed most suitable for application to detailed continuous-tone image areas. A halftoning method such as smooth dither is deemed most suitable for application to flat continuous-tone image areas. Also, hysteresis can be introduced to compensate for sharp transitions in the image and thereby eliminate ghosting.

16 Claims, 3 Drawing Sheets

ADAPTIVE HALFTONING BASED ON IMAGE CONTENT

BACKGROUND OF THE INVENTION

1. Field of the Invention

The present invention relates to digital image processing and, more particularly, to processing continuous-tone images into halftone images.

2. Description of the Related Art

Digital Halftoning is the process of transforming a continuous-tone image into a binary image that has the illusion of the original continuous-tone image. See, R. Ulchney, Digital Halftoning, MIT Press, Cambridge, Mass, 1987. In the case of color images, the color continuous-tone image is typically separated into color channels first. Separate halftones are then formed for each of the color channels.

Error diffusion (see, R. W. Floyd and L. Steinberg, "An adaptive Algorithm for Spatial Greyscale", Proc. SID, 17:75–77, 1976) is one important class of digital halftoning algorithms that renders continuous-tone images by thresholding their gray levels and distributing errors caused by the thresholding to neighboring unprocessed pixels. Error diffusion is good at producing image details. However, in flat regions, it often has visible artifacts such as worms that are difficult to eliminate.

Smooth dithers, on the other hand, are a class of halftoning methods that produce smooth textures in flat regions, but usually are less sharp for lack of feedback. One example of a smooth dither is Color Smooth Dither (CSD) (see, J. P. Allebach and Q. Lin, "Joint Design of Dither Matrices for a Set of Colorants", U.S. patent application Ser. No. 08/641,304, filed Apr. 30, 1996). Another example of a smooth dither is Super Smooth Dither (SSD) (see, Q. Lin, "Halftone Image Formation Using Dither Matrix Generated Based Upon Printed Symbol Models", U.S. Pat. No. 5,469,515, issued Nov. 21, 1995; Q. Lin, "Halftone Images Using Special Filters", U.S. Pat. No. 5,317,418, issued May 31, 1994).

Different halftoning algorithms are best for different types of images and different types of printers. For example, Table 1 shows the optimal halftoning algorithms for different image regions on a typical inkjet printer that is printing computer generated graphics. In the case of computer generated graphics, it is possible to select the optimal halftoning technique for a particular image because information about the type of image being halftoned is known to the print driver.

TABLE 1

Optimal Halftoning Algorithms
Computer Generated Graphics (object type known to the driver)

| | |
|---|---|
| text | error diffusion |
| line art | error diffusion |
| area fill | smooth dither |

Proper selection of a halftoning technique is especially important in rendering a scanned document, where there is a mixture of text, line art and area fill, and raster image. For example, Table 2 shows the optimal halftoning algorithms for different image regions on a typical inkjet printer that is printing a scanned document.

TABLE 2

Optimal Halftoning Algorithms
Scanned Document (object type not known to driver)

| | |
|---|---|
| text | error diffusion |
| line art | error diffusion |
| area fill | smooth dither |
| busy image region | error diffusion |
| smooth image region | smooth dither |

Similarly, proper selection of a halftoning technique is also important when rendering a digital photographic image that has a mixture of detailed regions and uniformly smooth colored regions. However, for images such as scanned photographic images, the print driver cannot select the best halftoning technique because it does not have any information regarding the composition of the page.

Thus, it can be seen that halftone imaging techniques impose image quality limits upon halftone image output devices, and hinder the use of these devices in many applications.

Therefore, there is an unresolved need for a technique that can improve halftone imaging by integrating different halftoning algorithms and managing their transitions based on image content.

SUMMARY OF THE INVENTION

A process and apparatus is described to improve halftone image quality by integrating different halftoning algorithms and managing their transitions based on image content.

The method works by applying different halftoning methods to different regions of a continuous-tone image. Regions of the continuous-tone image are evaluated to determine suitability for halftoning by at least two different halftoning methods. The most suitable halftoning method is then used to halftone a particular region.

An activity index can be used to evaluate each region of the image for suitability of halftoning by a particular halftoning method. A halftoning method such as error diffusion can then be deemed most suitable for application to detailed continuous-tone image areas. A halftoning method such as smooth dither can then be deemed most suitable for application to flat continuous-tone image areas. Also, hysteresis can be introduced to compensate for sharp transitions in the image and thereby eliminate ghosting.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–3. Those skilled in the art will readily appreciate that the detailed description given herein with respect to these figures is for explanatory purposes, however, because the invention extends beyond these limited embodiments.

ImageSmart is a technology for integrating different halftoning algorithms and managing their transitions based on image content. FIG. 1 shows an embodiment of a mechanism 100 for integrating smooth dither with error diffusion. The parameters $\alpha$ and $\beta$ are introduced to facilitate the transition between error diffusion and color smooth dither.

Figure 2:
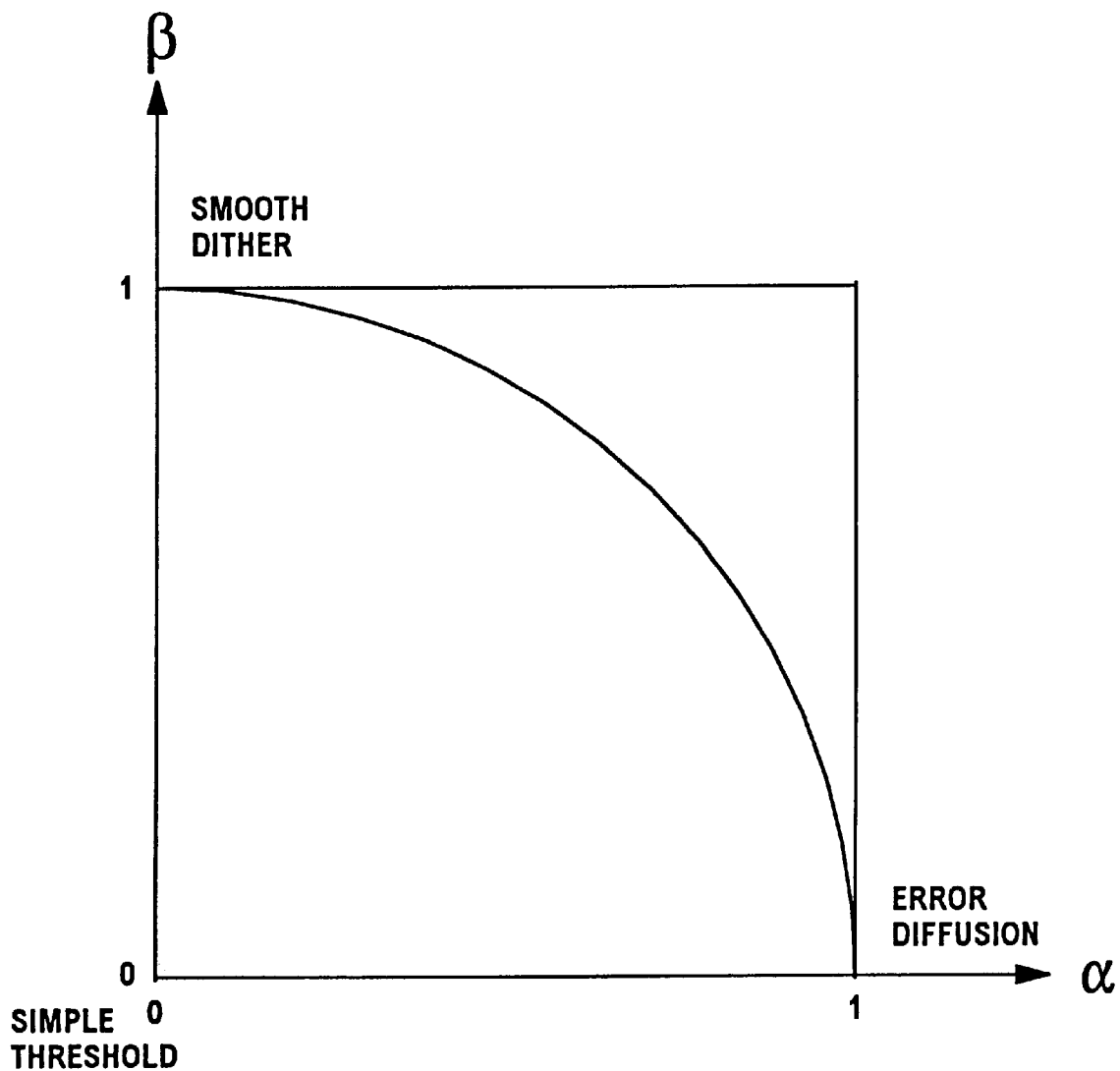
FIG. 2 is a diagram illustrating an embodiment of the use of α and β to control halftoning according to the present invention.

FIG. 2 illustrates the use of $\alpha$ and $\beta$ to control halftoning. The values of $\alpha$ and $\beta$ are normalized to a range between 0 and 1, as shown in FIG. 2. Equations 1 and 2 set forth calculations that are used to calculate threshold and error values for a particular $\alpha$ and $\beta$. Thus, $$\text{threshold} = \beta * t(i,j) + (1-\beta) * 0.5 \qquad (Eq. 1)$$

and $$\text{error} = \alpha * (c(i,j) - b(ij)) \qquad (Eq. 2)$$

where t(i,j) is the CSD dither matrix threshold, c(i,j) is the continuous tone image, and b(i,j) is the binary image, all at the current pixel location (i,j).

Under the control of $\alpha$, summer 110 can combine error propagated 140 from the previous pixel calculation with the continuous-tone image value at the present pixel. Under the control of , this sum can be thresholded 120 to form a binary image value at the present pixel. This binary image value is also negated and combined by summer 130 with the sum from summer 110. Error is then propagated 140 for use in halftoning the next pixel. The error propagation scheme can be the Floyd-Steinberg error diffusion or one of it's variations, where fractions of the error are propagated to neighboring pixels. Ulichney's book, mentioned earlier, provides descriptions of several such error propagation schemes.

Thus, when $\alpha$ is 0 and $\beta$ is 1, the resulting halftoning algorithm applied at the current pixel location (ij) is color smooth dither. Similarly, when $\alpha$ is 1 and $\beta$ is 0, the resulting halftoning algorithm is error diffusion. Finally, when both $\alpha$ and $\beta$ are 0, the resulting halftoning algorithm is simple thresholding.

Note that the $\alpha$ and $\beta$ values along the two line segments $$\alpha = 1, \ 0 \leq \beta \leq 1$$

and $$\beta = 1, \ 0 \leq \alpha \leq 1$$

preserves the graylevel of the continuous tone image. Other combinations of $\alpha$ and $\beta$ do not. However one can still use the values of the other combinations which may yield an image perceived to be cleaner than that provided by a faithful reproduction. As shown in ColorSmart (see U.S. Pat. No. 5,402,245, Ricardo D. Motta, Andrew E. Fitzhugh, Michael D. McGuire, and Gary J. Dispoto, "Bi-level Digital Color Printer System Exhibiting Improved Undercolor Removal and Error Diffusion Procedures", issued Mar. 28, 1995), sometimes a user prefers a cleaner looking image over a faithful reproduction.

Figure 1:
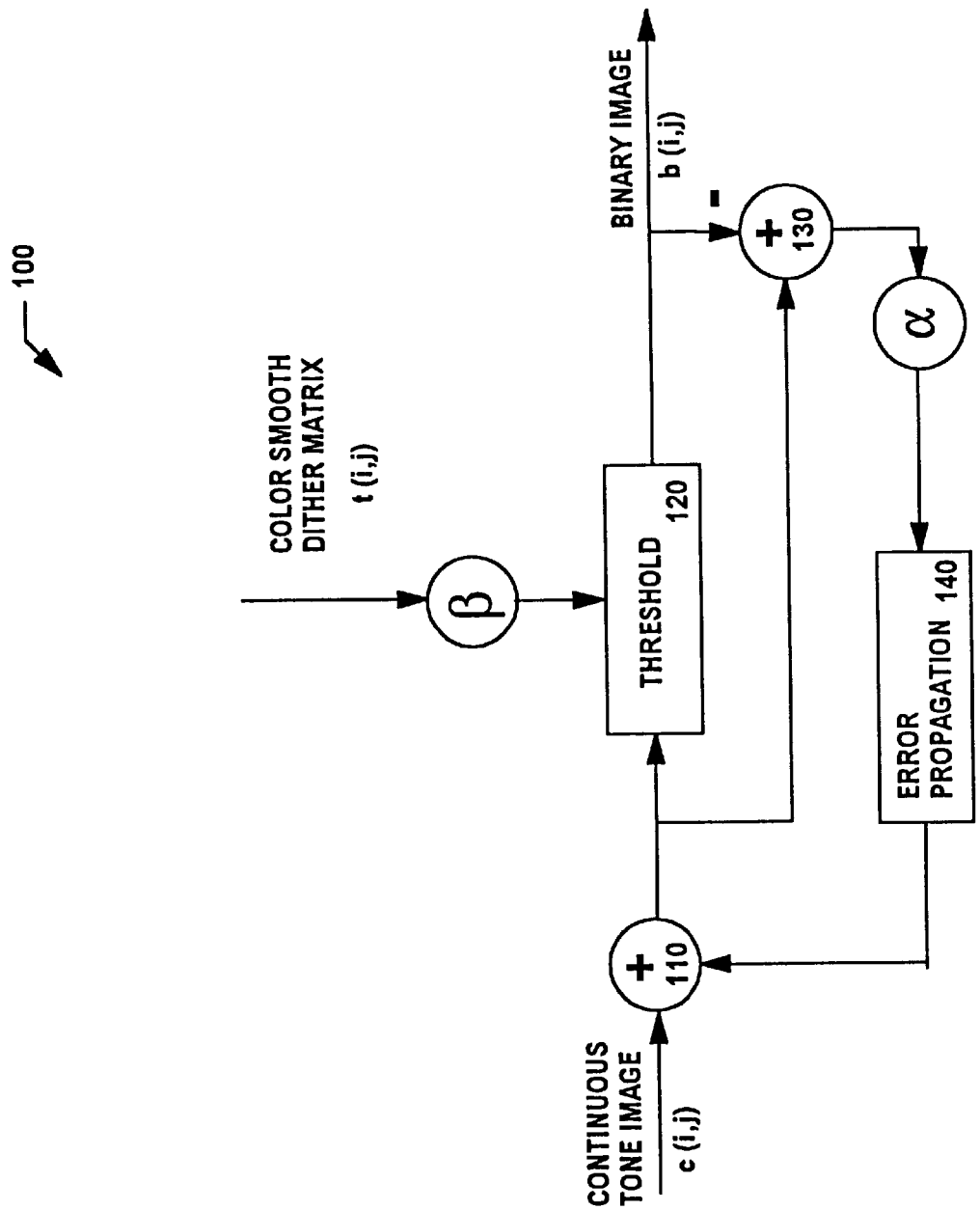
FIG. 1 is a drawing illustrating a halftoning mechanism for integrating smooth dither with error diffusion according to the present invention.

Alternately, although dither matrix t(i,J) is shown in FIG. 1 as being a color smooth dither matrix, other clustered dot or smooth dither techniques can be used.

To render a page with a mixture of text, line art, area fill, and photograph, it is preferable to render the busy areas such as text, line art and edge regions in a photograph, with the Floyd-Steinberg error diffusion algorithm, i.e., use $(\alpha, \beta)$ close to point (1,0) in FIG. 2. On the other hand, smooth areas, such as area fill and non-edge regions in a photograph, are better rendered with the color smooth dither, i.e., use $(\alpha, \beta)$ close to point (0, 1) in FIG. 2. As will be shown below, an activity index can be used to calculate whether an area is busy and smooth. Then, $\alpha$ and $\beta$ can be selected based upon the activity index calculation.

When there is a sharp transition in the image, there is a sharp transition in the halftoning algorithms correspondingly. This may cause a ghosting effect. The problem can be alleviated by introducing hysteresis in the activity index calculation. FIG. 3 is a flowchart illustrating selection between halftoning techniques at a particular pixel and introduction of hysteresis if appropriate.

Figure 3:
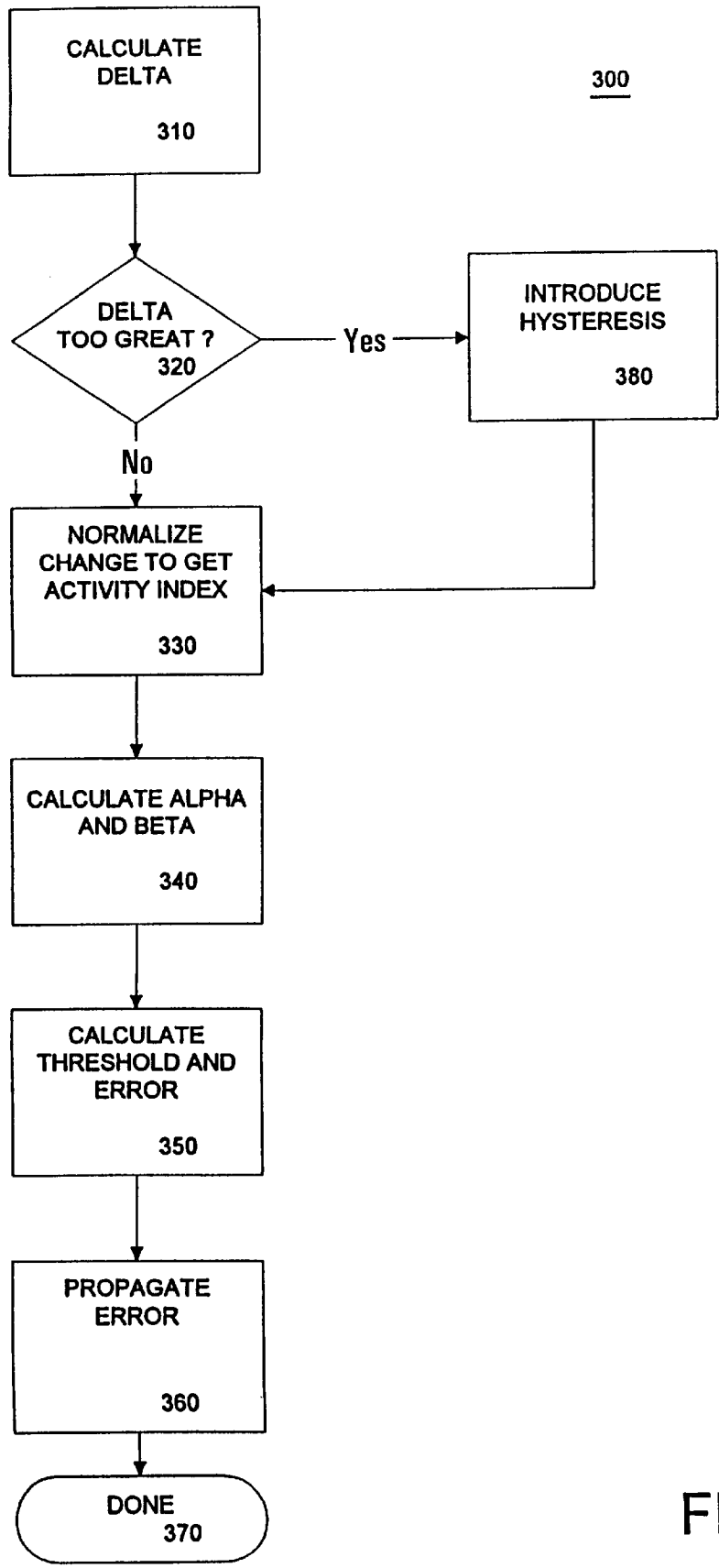
FIG. 3 is a flowchart illustrating selection between halftoning techniques at a particular pixel and introduction of hysteresis if appropriate.

In process 300 of FIG. 3, a change (DELTA) is calculated (310) for the neighborhood of a particular continuous-tone pixel j, of row i. For one embodiment, DELTA is calculated as follows:

$$DELTA = 4*(\text{abs}(CURR[J+1] - CURR[J]) + \text{abs}((PREV[J] - CURR[J]))$$

where four is a scaling factor and CURR is an array containing the J continuous tone values for the row. PREV is an array corresponding to CURR that is used to buffer the continuous tone values of the previous row. In the event that DELTA exceeds a value of 255, DELTA is set to 255.

For this particular calculation, change between the current pixel and the pixels immediately to its right and above it are combined to form DELTA. It is to be understood, however, that changes in other directions and across more pixels can alternately be considered when formulating a DELTA.

The flow of error propagation is right and down. Therefore, a ghosting effect can occurs in these directions unless hysteresis is introduced. For one embodiment, the DELTA of the previous pixel in the row and that of the pixel immediately above the current pixel are examined 320. Alternately, the change in activity index between the current pixel and the pixel immediately previous is compared. If the change is too great, then hysteresis is introduced by using an activity index that is proportional to the activity index used previously.

Thus, if there has not been a big change, then one can simply normalize 330 the DELTA value (e.g., to form index having a range from 0 to 1 rather than from 0 to 255). However, if there is a big drop in activity, then hysteresis is introduced 380 to gradually change the activity index. For one embodiment, if the present DELTA value is less than ninety percent of the previous DELTA value, rather than using the present DELTA value calculated in 310, a DELTA value that is ninety percent of the previous DELTA value is used. When hysteresis is introduced 370, the proportional DELTA is then normalized 330 to yield an activity index.

Once the activity index is normalized to have a range from 0 to 1, one can then calculate $\beta$ and $\alpha$ from index. For example, this can be accomplished by calculating an activity index according to an arc by using equations 3 and 4.

$$\beta = 1 - \text{index} \qquad (Eq. 3)$$

$$\alpha = \sqrt{1 - \beta^2} \qquad (Eq. 4)$$

Next, threshold and error can be calculated 350 using equations 1 and 2. Finally, error is propagated to future pixels 360 (e.g., using the Floyd-Steinberg filter and weightings) before termination 370 of calculations for the present pixel.

TESTING AND ADVANTAGES

The algorithm has been tested, for example by halftoning and then printing scanned magazine pages. Results show that the algorithm can produce sharp text and good image details, while free of worming artifacts. In addition, the ability to incorporate error diffusion into the halftoning process was found to suppress high frequency moire patterns typically caused by digital sampling of the halftone of the magazine pages.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for halftoning a continuous-tone image to form a halftone image, the process comprising the steps of:
    evaluating a region of the continuous-tone image to determine suitability for halftoning by at least two different halftoning methods; and
    halftoning the region using the most suitable halftoning method such that different halftoning methods are applied to different regions of the continuous-tone image, wherein an activity index is used to evaluate the region.

2. The process as set forth in 1, wherein a first halftoning method is most suitable for application to detailed continuous-tone image areas and a second halftoning method is most suitable for application to flat continuous-tone image areas.

3. The process as set forth in 2, wherein the first halftoning method is an error diffusion method.

4. The process as set forth in 2, wherein the second method is a dither method.

5. A process for halftoning a continuous-tone image to form a halftone image, the process comprising the steps of:
    evaluating a region of the continuous-tone image to determine suitability for halftoning by at least two different halftoning methods;
    halftoning the region using the most suitable halftoning method such that different halftoning methods are applied to different regions of the continuous-tone image; and introducing hysteresis to compensate for sharp transitions in the image.

6. The process as set forth in 5, wherein a first halftoning method is most suitable for application to detailed continuous-tone image areas and a second halftoning method is most suitable for application to flat continuous-tone image areas.

7. The process as set forth in 6, wherein the first halftoning method is an error diffusion method.

8. The process as set forth in 6, wherein the second method is a dither method.

9. A processor for halftoning a continuous-tone image to form a halftone image, the processor comprising:
    means for evaluating a region of the continuous-tone image to determine suitability for halftoning by at least two different halftoning methods; and
    means for halftoning the region using the most suitable halftoning method such that different halftoning methods are applied to different regions of the continuous-tone image, wherein an activity index is used to evaluate the region.

10. The processor as set forth in 9, wherein a first halftoning method is most suitable for application to detailed continuous-tone image areas and a second halftoning method is most suitable for application to flat continuous-tone image areas.

11. The processor as set forth in 10, wherein the first halftoning method is an error diffusion method.

12. The processor as set forth in 10, wherein the second method is a dither method.

13. A processor for halftoning a continuous-tone image to form a halftone image, the processor comprising:
    means for evaluating a region of the continuous-tone image to determine suitability for halftoning by at least two different halftoning methods;
    means for halftoning the region using the most suitable halftoning method such that different halftoning methods are applied to different regions of the continuous-tone image; and means for introducing hysteresis to compensate for sharp transitions in the image.

14. The processor as set forth in 13, wherein a first halftoning method is most suitable for application to detailed continuous-tone image areas and a second halftoning method is most suitable for application to flat continuous-tone image areas.

15. The processor as set forth in 14, wherein the first halftoning method is an error diffusion method.

16. The processor as set forth in 14, wherein the second method is a dither method.

* * * * *